(12) United States Patent
Asano et al.

(10) Patent No.: US 6,561,869 B2
(45) Date of Patent: May 13, 2003

(54) GEAR GRINDING MACHINE AND GEAR GRINDING METHOD

(75) Inventors: Masahiro Asano, Anjo (JP); Katsumi Nagasaka, Obu (JP); Toshiya Hayashi, Yokkaichi (JP); Hisatoshi Kojima, Toyota (JP)

(73) Assignee: Denso Corporation, Kariya (JP)

( * ) Notice: Subject to any disclaimer, the term of this patent is extended or adjusted under 35 U.S.C. 154(b) by 148 days.

(21) Appl. No.: 09/731,857

(22) Filed: Dec. 8, 2000

(65) Prior Publication Data

US 2002/0019195 A1 Feb. 14, 2002

(30) Foreign Application Priority Data

Dec. 10, 1999 (JP) ............................................ 11-351615
May 24, 2000 (JP) ......................................... 2000-157948

(51) Int. Cl.$^7$ .............................................. B24B 49/00
(52) U.S. Cl. ...................... 451/8; 451/5; 451/9; 451/10; 451/180
(58) Field of Search ............................ 451/5, 8, 9, 10, 451/61, 180, 219

(56) References Cited

U.S. PATENT DOCUMENTS

| | | | | |
|---|---|---|---|---|
| 4,203,258 A | * | 5/1980 | Held ............................ | 409/11 |
| 4,559,744 A | * | 12/1985 | Wirz ............................ | 409/12 |
| 4,561,216 A | * | 12/1985 | Miyatake et al. ............. | 409/15 |
| 5,076,022 A | * | 12/1991 | Ohta et al. .................... | 451/10 |
| 5,239,782 A | * | 8/1993 | Lorenz et al. ................ | 451/47 |
| 5,624,301 A | * | 4/1997 | Lenz et al. .................... | 451/21 |
| 6,234,880 B1 | * | 5/2001 | Scacchi ........................ | 451/443 |

FOREIGN PATENT DOCUMENTS

| | | |
|---|---|---|
| JP | 34-1650 | 3/1959 |
| JP | 5-104423 | 4/1993 |
| JP | 6-210515 | 8/1994 |

* cited by examiner

*Primary Examiner*—Joseph J. Hail, III
*Assistant Examiner*—Alvin J. Grant
(74) *Attorney, Agent, or Firm*—Harness, Dickey & Pierce, P.L.C.

(57) ABSTRACT

A gear grinding machine and a gear grinding method, in which a gear-shaped grinding stone is caused to engage a gear-like workpiece and one of the gear-shaped grinding stone and the gear-like workpiece is reciprocated relatively to the other in axial direction thereby to grind the tooth flanks of the workpiece, are disclosed. The rotational resistance is applied by a brake unit to the rotationally driven side. The grinding resistance and the rotational resistance interfering with the relative reciprocal motion are detected by torque sensors and input to a control unit, the average value of each of the signals is compared with a reference value by an arithmetic unit and, in the case where there is a difference between the average value and the reference value, the rotational resistance is changed by activating the brake unit. Thus, a high machining accuracy can be maintained even when the sharpness of the grinding stone is reduced.

25 Claims, 6 Drawing Sheets

GEAR GRINDING MACHINE AND GEAR GRINDING METHOD

BACKGROUND OF THE INVENTION

1. Field of the Invention

The present invention relates to a grinding machine and a grinding method for grinding the tooth flanks of a gear-like workpiece as a stock material with a gear-shaped grinding stone engageable with the particular tooth flanks in the process of manufacturing a gear-like product having internal teeth or external teeth.

2. Description of the Related Art

A method for grinding the tooth flanks of the internal teeth, such as a wire cut method or an electric discharge machining, is well known in the process of manufacturing a product having internal teeth such as an internal gear, a ring gear or an internal spline. The problem of the prior art, however, is that a long machining time is required and therefore volume production is difficult with small equipment. Another problem is a high price due to a high cost caused by an increased size of the machining equipment for volume production.

In the grinding machine or the grinding method for grinding the tooth flanks of a gear-like object to be machined (workpiece), having internal or external teeth, with a grinding stone engageable with the particular gear flanks, a contact pressure of a predetermined magnitude is required to be generated in the machining section in which the tooth flanks of the gear-shaped grinding stone and the tooth flanks of the gear-like workpiece to be ground are in contact with each other. A conventional grinding method is known as a technique meeting this requirement, in which a gear-shaped grinding stone and a gear-like workpiece in mesh with each other are rotated simultaneously in complete synchronism with each other. However, the mechanism for synchronously rotating the grinding stone and the workpiece requires a high accuracy, and therefore the machining equipment cost is very high. Thus, this method is not economical from the viewpoint of the machining cost.

In a comparatively simple conventional method described in Japanese Unexamined Patent Publication (Kokai) No. 34–1650, on the other hand, a gear-shaped grinding stone is rotated thereby to cause the free running of a gear-like workpiece in mesh with the grinding stone, while the driven workpiece is braked thereby to exert a resistance (rotational resistance) of a predetermined magnitude on the rotation of the workpiece. The contact pressure required for grinding is thus generated in the machining section, thereby grinding the tooth flanks of the workpiece.

The prior art using the free-running method described in the patent publication cited above, however, cannot successfully meet the unavoidable deterioration with age including the reduced sharpness of the grinding stone and the reduced rotational resistance to the gear-like workpiece caused by the wear of the brake. Also, the prior art, which never intends to control the magnitude of the rotational resistance with high accuracy, harbors a problem that the tooth flanks of the workpiece cannot always be finished with high accuracy.

SUMMARY OF THE INVENTION

An object of the present invention is to cope with the problem of the prior art described above and to provide an improved internal tooth grinding machine which can grind the internal teeth at high speed with small machining equipment while at the same time making possible volume production with high accuracy at low cost.

Another object of the invention is to provide a grinding machine constituting a simple, inexpensive machining means employing the free-running method as in the prior art described above, wherein a sufficiently high machining accuracy can be maintained in keeping with the deterioration with age including the reduced sharpness of the grinding stone and the reduced rotational resistance due to the brake wear, thus making it always possible to grind a gear-like workpiece with high accuracy on the one hand and a novel method of grinding a gear-like workpiece on the grinding machine on the other hand.

In order to achieve the objects described above, according to one aspect of this invention, there is provided an internal tooth grinding machine for grinding the tooth flanks of the internal teeth of a workpiece having a circular outer periphery and a gear-shaped inner periphery in such a manner that the workpiece is caused to engage with a grinding stone having external teeth formed on the outer periphery thereof, and one of the grinding stone and the workpiece is rotated with the other run free, while at the same time reciprocating one of the grinding stone and the workpiece relatively to the other in an axial direction, the internal tooth grinding machine comprising:

at least two rollers located on the outer periphery of the workpiece for holding the workpiece at a machining position by holding the workpiece in collaboration with the grinding stone located on the inner periphery of the workpiece;

a plurality of bearings for rotatably supporting the rollers, respectively;

a block for supporting the bearings; and a roller support unit for pressing the workpiece against the grinding stone through the blocks and the rollers.

The internal tooth grinding machine according to the invention basically operates in such a manner that one of the gear-shaped grinding stone and the workpiece having internal teeth is rotated while the other, in mesh, is run free thereby to grind the tooth flanks of the workpiece. In the case where only the contact points of the tooth flanks, formed by free running, are ground, the force is concentrated only on the narrow contact points between the external tooth flanks of the grinding stone and the internal tooth flanks of the workpiece. In that case, only the slight slip between the tooth flanks of the grinding stone and the workpiece contributes to the grinding work and, therefore, high-speed, high-accuracy grinding would be impossible. In the internal tooth grinding machine according to the invention, on the other hand, not only one of the grinding stone and the workpiece is run free but also both are reciprocated relatively to each other in the axial direction at the same time, and therefore all the parts of the gear profile including the tips and bottoms of the workpiece can be ground at high speed with high accuracy. The effect of the reciprocal motion is strengthened by the fact that a force is exerted on the contact surface between the grinding stone and the workpiece due to the free running. In other words, the free running and the reciprocal motion have a multiplier effect.

In the internal tooth grinding machine according to the invention, a workpiece with a circular outer periphery is supported rotatably by at least two rollers. Therefore, the outer periphery of the workpiece and the parts of the grinding machine supporting the workpiece are prevented from wearing. As a result, the machining accuracy and the durability of the grinding machine are further improved.

An alternative method for running the workpiece or the grinding stone freely while at the same time reciprocating them relatively to each other along the rotational axis consists in rotating the grinding stone with a grinding stone support unit while at the same time causing the same grinding support unit to drive the grinding stone to reciprocate along the axial direction. Still another method is to drive the rollers in the rotational direction by a rotation drive unit while running the workpiece and the grinding stone freely. Preferably, however, the grinding stone rotatably supported by the grinding stone support unit is preferably reciprocated in the axial direction.

The internal tooth grinding machine according to the invention, which usually employs at least two rollers, desirably comprises three or more rollers for stabilizing the supported condition of the workpiece leading to a further improved the workpiece machining accuracy and the durability of the grinding machine. Further, in the case where the machine comprises three or more rollers, at least one block supporting a roller is separated from the other blocks supporting rollers, so that the former is movable relative to the latter in the radial direction of the rollers. In this way, the workpiece can be conveniently mounted at the machining position between the rollers or recovered from the machining position after complete machining process by changing the intervals between the rollers.

In any case, by forming an annular groove along the outer peripheral surface, i.e. along the peripheral direction of the rollers for engaging the workpiece, the workpiece would not come off from the rollers thereby making it possible to perform the grinding work both positively and accurately.

According to the invention, there is also provided a gear grinding machine having the following configuration as other means for solving the problems described above.

The grinding machine according to the invention comprises:

means for detecting the magnitude of the grinding resistance exerted along the axial direction of a gear-shaped grinding stone in such a manner as to interfere with the reciprocal motion of the gear-shaped grinding stone along the rotational axis; and/or means for detecting the magnitude of the rotational resistance exerted in the direction opposite to the rotational direction of the gear-shaped grinding stone in such a manner as to interfere with the rotational motion of the gear-shaped grinding stone;

means for applying the rotational resistance to one of the gear-shaped grinding stone and the gear-like workpiece or a gear-shaped grinding stone shaping member which is run free in such a manner as to interfering with the rotation of that one of the gear-shaped grinding stone and the gear-like workpiece or the gear-shaped grinding stone shaping member which is run free, respectively; and means for controlling the rotational resistance application means;

wherein, when the grinding force of the gear-shaped grinding stone decreases to such an extent due to the secular wear of the gear-shaped grinding stone or the rotational resistance application means that the resulting increased grinding resistance is detected by the grinding resistance detection means or the resulting decrease in the rotational resistance is detected by the rotational resistance detection means, then the rotational resistance control means controls the rotational resistance application means thereby to increase the rotational resistance against the gear-like workpiece or the gear-shaped grinding stone shaping member.

As a result, the gear-like workpiece or the gear-shaped grinding stone shaping member is prevented from being relieved in the rotational direction, and the contact pressure is increased which is exerted on the machining section or the shaping section between the tooth flanks of the gear-shaped grinding stone and the tooth flanks of the gear-like workpiece or the gear-shaped grinding stone shaping member in mesh with the gear-shaped grinding stone. In this way, it is possible to prevent a reduction in the grinding capacity or the shaping capacity which otherwise might be caused by the secular wear of the gear-shaped grinding stone or the rotational resistance application means. Thus, the gear grinding work or the shaping of the gear-shaped grinding stone, which is always stable and high in accuracy, is made possible free of secular variations.

More specifically, the rotational resistance application means includes a brake unit, the grinding resistance detection means can be a torque sensor for detecting the torque of the motor for reciprocating the gear-shaped grinding stone along the axial direction, and the rotational resistance detection means can be a torque sensor for directly detecting the torque of the motor for rotating the gear-shaped grinding stone. Also, the rotational resistance control means can include arithmetic means for calculating the average value of each of the signals detected by the grinding resistance detection means and the rotational resistance detection means, comparing the average value with a predetermined reference value and applying a control signal corresponding to the difference to the rotational resistance application means. More specifically, these torque sensors can be configured with a current sensor for detecting the value of the current flowing in the motor.

According to still another aspect of the invention for solving the problems described above, there is provided a gear grinding method for grinding the tooth flanks of a gear-like object to be machined or shaping a gear-shaped grinding stone in such a manner that the gear-shaped grinding stone is caused to engage the gear-like object or a gear-shaped grinding stone shaping member, and one of the gear-shaped grinding stone and the gear-like object or the gear-shaped grinding stone shaping member, as the case may be, is rotated with the other run free, while at the same time reciprocating one of the gear-shaped grinding stone and the gear-like object or the gear-shaped grindings stone shaping member relative to the other along the axial direction, the method comprising the steps of:

detecting the magnitude of the grinding resistance exerted in such a manner as to interfere with the reciprocal motion while at the same time detecting the magnitude of the rotational resistance exerted in the direction opposite to the rotational direction of the gear-shaped grinding stone and the gear-like object or the gear-shaped grinding stone shaping member in such a manner as to interfere with the rotational motion of the gear-shaped grinding stone and the gear-like object or the gear-shaped grinding stone shaping member, respectively;

applying the rotational resistance to that one of the gear-shaped grinding stone and the gear-like object and the gear-shaped grinding stone shaping member which is run free in such a manner as to interfere with the rotation of one of the gear-shaped grinding stone and the gear-like object and the gear-shaped grinding stone shaping member, respectively; and changing the magnitude of the grinding resistance and the magnitude of the rotational resistance toward a corresponding reference value by controlling the rotational resistance application means upon detection of a change of at least one of the grinding resistance and the rotational resistance;

wherein only the grinding resistance or the rotational resistance may be detected to control the rotational resistance application means in accordance with the change of the detected value.

The gear-like workpiece making up an object to which the gear grinding method described above is applicable is not necessarily confined to the workpiece of internal gear type, but may include an external gear, a bevel gear or another gear-like workpiece. The feature of the gear grinding method according to the invention lies in that when the gear-shaped grinding stone is reciprocated for grinding, the magnitude of the grinding resistance exerted in axial direction in a manner to interfere with the reciprocating motion is detected or the magnitude of the rotational resistance exerted in the direction opposite to the rotational direction of the gear-shaped grinding stone in a manner to interfere with the rotational motion of the gear-shaped grinding stone is directly detected; the rotational resistance is applied by the rotational resistance application means in a manner to interfere with the rotation of that one of the gear-shaped grinding stone and the gear-like workpiece or the gear-shaped grinding stone shaping member which is run free; and upon detection of a change in the grinding resistance or the rotational resistance, the rotational resistance application means is controlled thereby to change the magnitude of the rotational resistance toward a reference value.

As a result, the gear-like workpiece or the gear-shaped grinding stone shaping member is prevented from being relieved in the rotational direction, thereby increasing the contact pressure exerted on the machining section or the shaping section between the gear-shaped grinding stone and the gear-like workpiece or the gear-shaped grinding stone shaping member, as the case may be. Thus, it is made possible to prevent the grinding or shaping capacity from being decreased. Thus, the tooth flanks of gears of various shapes can be always stably ground with high accuracy free of secular variations.

BRIEF DESCRIPTION OF THE DRAWINGS

The above and other objects, features and advantages will be made apparent by the detailed description taken in conjunction with the accompanying drawings, in which.

DESCRIPTION OF THE PREFERRED EMBODIMENTS

Figure 1:
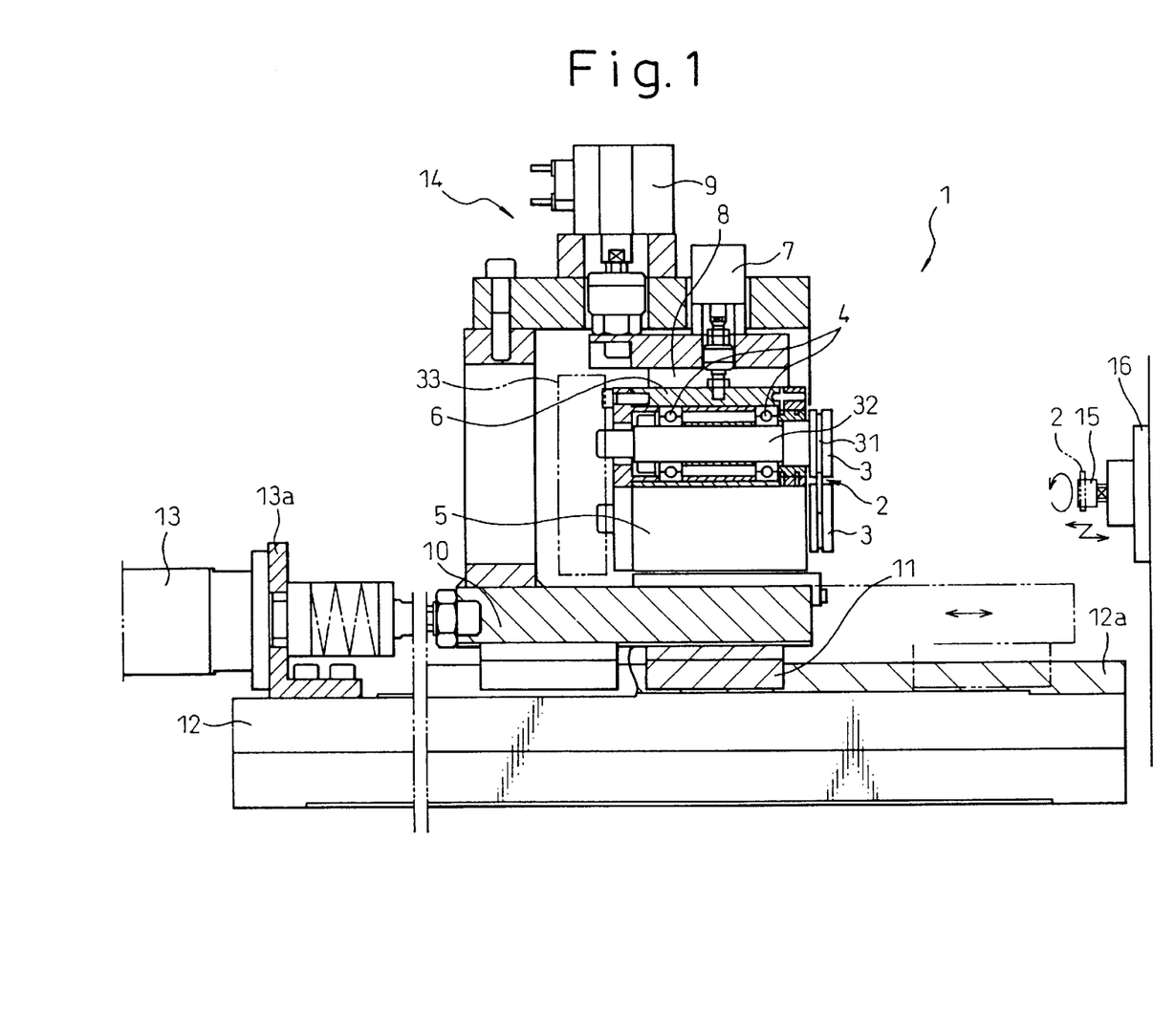
FIG. 1 is a front longitudinal sectional view showing a general configuration of an internal tooth grinding machine according to a preferred embodiment of the present invention.

A detailed structure of an internal tooth grinding machine 1 according to a first embodiment of the invention will be explained with reference to FIGS. 1 to 3. FIG. 1 is a front longitudinal sectional view showing a general configuration of the grinding machine 1, FIG. 2 is a partly cutaway, partly omitted side view taken from one side of the grinding machine 1, and FIG. 3 is a perspective view with the essential parts shown enlarged.

Figures 2, 3:
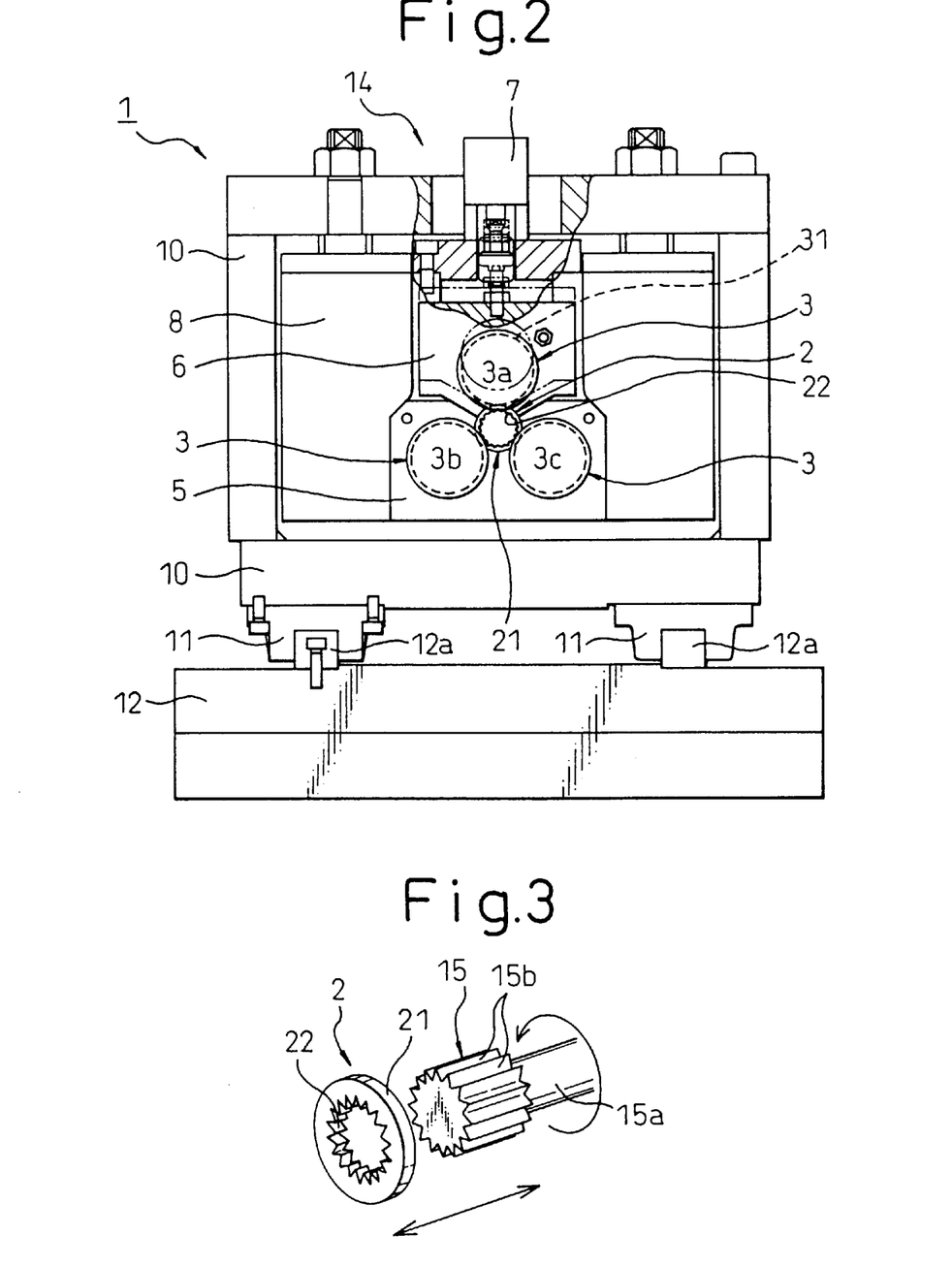
FIG. 2 is a partly cutaway, partly omitted side view of the grinding machine shown in FIG. 1.
FIG. 3 is a perspective view of the grinding machine of FIGS. 1 and 2 showing only the essential parts thereof in enlarged form.

As seen from FIG. 3, reference numeral 2 designates an annular workpiece in the shape of an internal gear of a predetermined thickness. The outer peripheral surface 21 of the workpiece 2 is a smooth circle, while a multiplicity of internal teeth 22 are formed over the whole inner peripheral surface by the preliminary machining process according to a first embodiment. According to this invention, however, a multiplicity of the internal teeth 22 are not necessarily formed uniformly over the whole inner peripheral surface of the annular workpiece 2. Instead, the workpiece 2 having the internal teeth can be a partly toothless gear-like workpiece formed with at least one tooth 22 only in a part of the inner peripheral surface thereof with the remaining part of the inner peripheral surface formed as a circular toothless surface (extension of the tooth bottom).

Numeral 3 designates a plurality of rollers for rotatably supporting the workpiece 2 with a circular outer peripheral surface 21 in the machining position. In the case of the first embodiment, three rollers 3a, 3b, 3c are arranged at uniform angular intervals around the workpiece 2 in the machining mode as shown in FIG. 2. The outer peripheral surface of each roller 3 is circular, and is formed with an annular roller groove 31 adapted to contact and receive the outer peripheral surface 21 of the workpiece 2. A shaft 32 mounted integrally at the center of each roller 3 is rotatably supported by a plurality of bearings 4 which in turn are mounted on a fixed block 5 or a movable block 6 described later.

Specifically, according to the first embodiment, only the uppermost roller 3a among the three rollers 3 is supported by the movable block 6 through the bearings 4. The two lower rollers 3b, 3c, in contrast, are each supported by what is called the fixed block 5 through the bearings 4. Numeral 7 designates a first actuator for moving the movable block 6 vertically. Numeral 8 designates a first stand 8 for integrally holding the fixed block 5 and supporting the base portion of the first actuator 7. In this way, the movable block 6 is adapted to move vertically relative to and along the first stand 8 by the extension/contraction of the first actuator 7. Neither the first stand 8 nor the fixed block 5 mounted integrally on the first stand 8, however, is fixed in the true sense of the word but can be slightly moved vertically relative to and along a frame-shaped second stand 10 by the extension/contraction of the second actuator 9 the base of which is mounted on the frame-shaped second stand 10.

Numeral 11 designates a plurality of sliders mounted under the second stand 10. These sliders slidably engage a pair of guide rails 12a mounted in parallel to each other on a base 12 supporting the whole of the grinding machine 1, so that the second stand 10 and the first stand 8, the blocks 5, 6 and the rollers 3 supported by the second stand 10 are guided and movable horizontally in the direction parallel to the axis of the shaft 32 in FIG. 1. In order to move the second stand 10, etc. along the direction of the guide rail 12a, a third actuator 13 is arranged as shown at the left end of FIG. 1 and has a base portion 13a mounted on the base 12.

In FIG. 1, the whole configuration including a plurality of parts coupled to each other to support a plurality of the rollers 3 rotatably and displaceably is designated collectively as a roller support unit by reference numeral 14. As viewed from the roller support unit 14, a grinding stone support unit 16 for rotatably supporting the grinding stone 15 having a gear-like shape is arranged, as shown enlarged in FIG. 3, on the extreme right side of the grinding machine 1 of FIG. 1. According to the first embodiment, the grinding stone support unit 16 not only rotatably supports the grinding stone 15 but also includes a mechanism for driving the grinding stone in such a manner as to continuously rotate by power through a grinding stone shaft 15a while at the same time reciprocating along the axial direction.

The grinding stone 15 has external teeth 15b adapted to engage the internal teeth 22 of the workpiece 2. Even in the case where the workpiece 2 is a normal internal gear and not a partly toothless gear, the number of the external teeth 15b of the grinding stone 15 is set to a value somewhat smaller than the number of the internal teeth 22 of the workpiece 2. As to the size, on the other hand, the outer diameter (diameter of the tip circle) of the grinding stone 15 is set to a value somewhat smaller than the inner diameter (diameter of the tooth bottom) of the workpiece 2 so that the grinding stone 15 can be inserted smoothly into the internal tooth of the workpiece 2. According to the first embodiment, the center of the workpiece 2 supported at the machining position by the three rollers 3 is set to a position deviated by a predetermined amount from the axial line of the grinding stone shaft 15a.

A fluid pressure cylinder such as an oil-hydraulic cylinder or pneumatic cylinder or means for converting the output rotation of an electric motor into the linear displacement using a screw mechanism or a cam mechanism or the like linear motion actuator can be selectively used as the first actuator 7, the second actuator 9 or the third actuator 13. In such a case, the moving position of the actuator, as a servo mechanism, is desirably controlled, by feedback, by an electronic control unit and a sensor not shown.

Now, the operation of the internal tooth grinding machine 1 according to a first embodiment will be explained. First, by contracting the first actuator 7, the movable block 6 and the upper roller 3a supported by the movable block 6 are moved upward to increase the distance from the two lower rollers 3b, 3c, after which the workpiece 2 formed with internal teeth in the preliminary process is mounted with the outer peripheral surface 21 thereof contacting and engaging the interior of the roller grooves 31 of the two lower rollers 3b, 3c at the same time. After that, the first actuator 7 is extended so that the movable block 6 and the upper roller 3a are lowered, and the upper portion of the outer peripheral surface 21 of the workpiece 2 is brought into contact and caused to engage the roller groove 31 of the upper roller 3a. Thus, the workpiece 2 is held between the three rollers 3a, 3b, 3c arranged at uniform angular intervals, and the workpiece 2 is slightly pressed down by applying a predetermined force to the roller 3a, thus completing the step of setting up the workpiece 2.

After complete the set-up of the workpiece 2, the third actuator 13 is extended and the slider 11 of the second stand 10 is slid on the guide rail 12a of the base 12 to a position where the grinding stone 15 is inserted into the internal space of the workpiece 2. In order to bring the internal teeth 22 of the workpiece 2 into engagement with the external teeth of the grinding stone 15, i.e. in order to bring them into partial contact and engagement with each other, the second actuator 9 is slightly contracted. As a result, the first stand 8 and the fixed block 5 slightly move up, and the external teeth of the grinding stone 15 come into contact mainly with the corresponding internal teeth 22 constituting the lower portion of the workpiece 2. When the grinding stone 15 is rotationally driven by the power source built in the grinding stone support unit 16, the workpiece 2 in mesh with the grinding stone 15 also rotates. At the same time, the grinding stone 15 is reciprocated in the direction along the grinding stone shaft 15a by a mechanism also built in the grinding stone support unit 16, and a large relative displacement occurs mainly in axial direction at the contact point between the surface of the external teeth 15b of the grinding stone 15 and the surface of the internal teeth 22 of the workpiece 2. In this way, an efficient grinding work is performed.

As described above, the grinding stone 15 is driven not only to reciprocate in the direction along the grinding stone shaft 15a but also rotated in the rotational direction by the grinding stone support unit 16 so that the workpiece 2 having internal teeth also engages the grinding stone 15 and rotates. In the process, the three rollers 3, of which the respective shafts 32 are supported by the bearings 4, are run free and come into contact with the grinding stone 15 uniformly and with equal strength when the internal teeth 22 of the workpiece 22 come to the lower position. The grinding process described above is repeated for a predetermined length of time until the surface of the internal teeth 22 is completely ground over the whole inner periphery of the workpiece 2.

It was explained above with reference to the first embodiment that the grinding stone 15 is rotationally driven by the grinding stone support unit 16 so that the workpiece 2 having the internal teeth in mesh with the grinding stone 15 is run free. In a modification of this embodiment, by contrast, the workpiece 2 is continuously driven rotationally while causing the grinding stone 15 in mesh with the workpiece 2 to run free. As a means for rotationally driving the workpiece 2, a drive unit 33 for rotationally driving the shaft 32 of at least one of the three rollers 3 is arranged at a position indicated by two-dot chain FIG. 1. In such a case, the mechanism for reciprocating the workpiece 2 along the axial direction is liable to be complicated and, therefore, as in the embodiment described above, a mechanism for reciprocating the grinding stone 15 along the axial direction is desirably built into the grinding stone support unit 16.

In the case where the workpiece 2 having internal teeth is partly toothless, however, the grinding stone 15 or the workpiece 2 cannot be rotationally driven by driving only the workpiece 2 or the grinding stone 15, respectively. In such a case, therefore, another gear mechanism is required for operatively interlocking the grinding stone 15 and the workpiece 2.

According to the first embodiment, in addition to the three rollers 3a, 3b, 3c which support the workpiece 2, the grinding stone 15 in contact, and meshing, with the inner periphery of the workpiece 2 having internal teeth has the function to support the workpiece 2. It is therefore possible to support the workpiece 2 at the machining position only with at least the two rollers 3b, 3c under the workpiece 2 and the grinding stone 15.

In conjunction with the foregoing description, concrete specifications of the first embodiment will be illustratively described. In a more specific embodiment, the workpiece 2 has 17 internal teeth 22, while the grinding stone 15 in mesh with the workpiece 2 has 14 external teeth 15b and the outer diameter of the grinding stone 15 is smaller than the inner diameter of the workpiece 2 (the diameter of the root circle of the internal teeth 22). Also, the rotational speed of the grinding stone 15 and the workpiece 2 is selected from within the range of 100 to 1000 rpm, and the cycle of the reciprocal motion of the grinding stone in axial direction is selected from within the range of 10 to 30 Hz.

Figure 4:
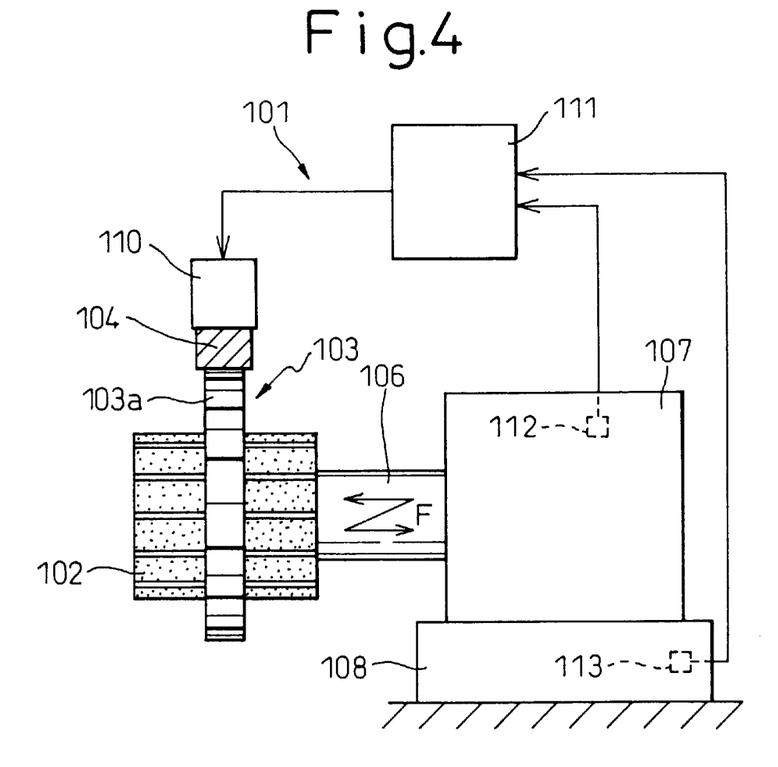
FIG. 4 is a partly cutaway front view schematically showing a general system configuration of a grinding machine according to a second embodiment of the invention.
Figure 5:
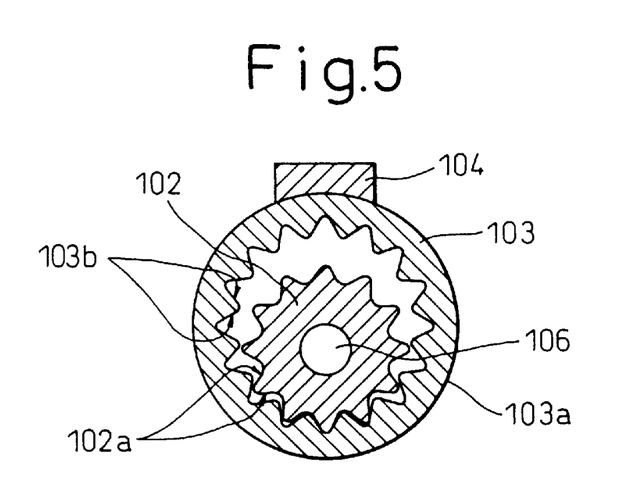
FIG. 5 is a side cross sectional view showing a part of the grinding machine of FIG. 4.

Now, the configuration and operation of the grinding machine 101 for a gear-like workpiece according to a second embodiment of the invention will be explained with reference to FIGS. 4 to 7. FIG. 4 is a partly cutaway front view schematically showing a general system configuration of the grinding machine 101, FIG. 5 is a cross sectional side view showing the relation of engagement between the gear-shaped grinding stone 102 constituting a part of the grinding machine 101 shown in FIG. 4, the gear-like workpiece 103 ground by the gear-shaped grinding stone 102 and the brake unit 104 frictionally engaging the workpiece 103 for applying the rotational resistance to the workpiece 103, FIG. 6 is a cross sectional side view showing the operation of the engagement configuration of FIG. 5 further including a V-shaped rest 105, etc. making up a supporting portion of the workpiece 103, and FIG. 7 is a block diagram illustrating the configuration of a control unit 111.

Figure 6:
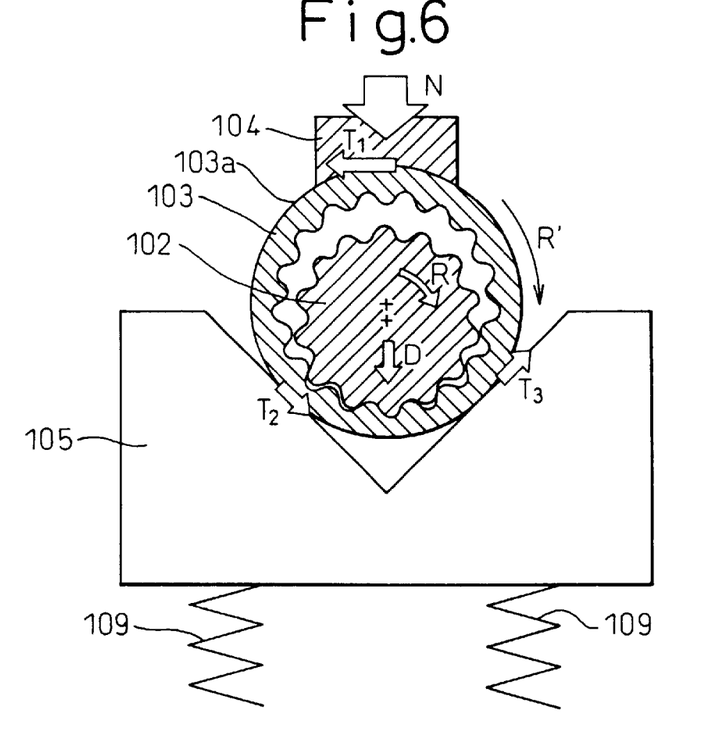
FIG. 6 is a side cross sectional view showing the operation of a part of the grinding machine of FIG. 4.
Figure 7:
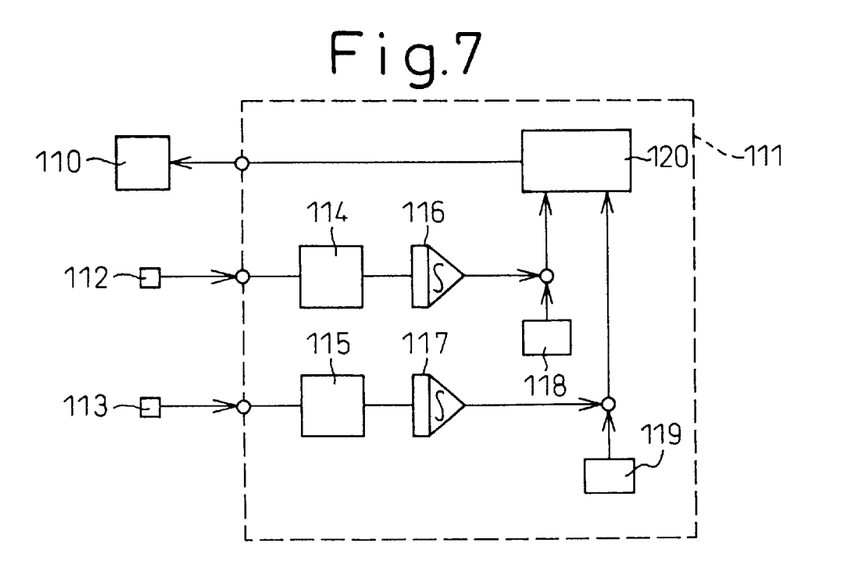
FIG. 7 is a block diagram illustrating a configuration of an arithmetic unit.

As is apparent from FIGS. 4 and 6, according to the second embodiment, the annular outer peripheral surface 103a of the gear-like workpiece 103 in the shape of an internal gear is placed on the V-shaped rest 105 lubricated by a lubrication oil film and slidably supported in the rotational direction. Thus, the workpiece 103 can rotate while receiving a small amount of rotational resistance at the supported position. The gear-shaped grinding stone 102 is inserted into and is in mesh with the workpiece 103. Though not shown, the workpiece 103 may be supported by a plurality of rotatable rollers or metal bearings in place of the V-shaped rest 105.

The rotary shaft 106 of the gear-shaped grinding stone 102 is supported by the bearings not shown arranged in the grinding stone-rotation motor 107 and is driven in the direction of arrow R by the rotation motor 107. The rotation motor 107 is supported in its entirety by a movable portion, not shown, of a motor 108 for reciprocating the grinding stone. This movable portion is reciprocated in the direction of the rotary shaft 106 upon activation of the reciprocating motor 108, so that the rotation motor 107, the rotary shaft 106 and the gear-shaped grinding stone 102 reciprocate in axial direction. For this purpose, the outer shell of the reciprocating motor 108 is fixed on a frame not shown. Numeral 109 in FIG. 6 designates a spring for supporting the V-shaped rest 105 elastically and the arrow D indicates the cutting direction of the grinding stone 102.

The mechanical portion of the gear-like workpiece grinding machine 101 has a configuration generally described above. When the rotation motor 107 and the reciprocating motor 108 are rotated by the power supplied from a power supply not shown, therefore, the gear-shaped grinding stone 102 is rotated in the direction of arrow R in FIG. 6 by the rotation motor 107, so that the gear-like workpiece 103 is run freely in the direction of arrow R'. At the same time, the rotary shaft 106 is reciprocated in axial direction, as indicated by double arrow F in FIG. 4, by the operation of the reciprocating motor 108, and the grinding stone 102 reciprocates within the workpiece 103 relatively to the workpiece 103 in axial direction. The braking force is applied to the workpiece 103 by the brake unit 104, and therefore a contact pressure is generated in the machining section at which the tooth flanks 103b of the workpiece 103 are in contact with the tooth flanks 102a of the gear-shaped grinding stone 102, thereby grinding the tooth flanks 103b of the workpiece 103.

The brake unit 104 is intended to brake by applying a rotational resistance (imposing a load) of an arbitrary magnitude to the gear-like workpiece 103 on the driven side in order to generate a contact pressure of a magnitude required for the machining section. The brake unit 104 is energized by a brake actuator 110 having an ordinary hydraulic, pneumatic or electromagnetic structure, so that the brake load indicated by arrow N is imposed on and frictionally engages the outer peripheral surface 103a of the workpiece 103.

As a result, the rotational resistance indicated by arrow $T_1$ in FIG. 6 is generated in the contact area between the outer peripheral surface 103a of the workpiece 103 and the brake unit 104, while at the same time generating a comparatively small rotational resistance $T_2$ and $T_3$ in the contact area between the outer peripheral surface 103a and the V-shaped rest 105. The magnitude of the rotational resistance $T_1$, $T_2$ and $T_3$ is a function value changeable upward or downward in accordance with the magnitude of the brake load N. The rotational resistance T making up the sum of the rotational resistance $T_1$, $T_2$ and $T_3$ is also a function with the brake load N as a variable.

This rotational resistance T acts as a rotational load on the gear-like workpiece 103. In the case where the workpiece 103 is run free by the gear-shaped grinding stone 102 and the contact pressure is generated in the machining section where the tooth flanks 102a and the tooth flanks 103b come into contact with each other, therefore, the workpiece 103 is prevented from being relieved by rotating an extra small angle on the V-shaped rest 105 in such a direction as to reduce the contact pressure. Thus, a contact pressure corresponding to the magnitude of the rotational resistance T is generated in the machining section, with the result that the grinding force is effectively exerted from the tooth flanks 102a of the grinding stone 102 on the tooth flanks 103b of the workpiece 103.

The control unit 111 shown as a simple block in FIG. 4 has a specific configuration as shown in the block diagram of FIG. 7. In FIG. 7, numeral 112 designates a torque sensor added to the rotation motor 107 shown in FIG. 4, and numeral 113 another torque sensor added to the reciprocating motor 108. The torque signals output from the torque sensors 112, 113 are input to the control unit 111 in the form of an electrical signal such as a voltage. These signals are amplified by amplifier circuits 114, 115, respectively, and then sent to smoothing/filter circuits 116, 117, respectively, in which the signals are averaged out into average torque signals. Thus, these average torque signals indicate the average values of the present load torques of the rotation motor 107 and the reciprocating motor 108, respectively.

The control unit 111 includes therein a grinding stone rotational torque reference voltage generating circuit 118 and a grinding stone reciprocating torque reference voltage generating circuit 119. The reference voltage generating circuits 118, 119 each generate such a reference torque signal that the brake unit 104 operated through the control unit 111 can generate a contact pressure of a predetermined magnitude at the machining section where the tooth flanks 102a of the gear-shaped grinding stone 102 are brought into contact with the tooth flanks 103b of the workpiece 103. In this way, a pair of difference signals representing the difference between each of a pair of the average torque signals formed as described above and the corresponding reference signal are sent to the arithmetic circuit 120 for arithmetic operation, with the result that a control signal is output to the brake actuator 110.

The brake actuator 110, in accordance with the control signal received from the control unit 111, changes the degree of braking force applied to the outer peripheral surface 103a of the gear-like workpiece 103 by moving the brake unit 104 and thereby changes the magnitude of the rotational resistance T (i.e. $T_1+T_2+T_3$). As a result, the contact pressure at the machining section where the tooth flanks 102a of the gear-shaped grinding stone 102 and the tooth flanks 103b of the workpiece 103 are in contact with each other is changed (usually upward) thereby to prevent the workpiece 103 from being relieved in the rotational direction. In this way, the proper grinding force is exerted from the tooth flanks 102a of the grinding stone 102 to the tooth flanks 103b of the workpiece 103.

At the same time that the rotational resistance of the gear-like workpiece 103 changes, the magnitude also changes of the grinding resistance generated when grinding the tooth flanks 103b of the workpiece 103 by reciprocating the gear-shaped grinding stone 102 along the direction of the rotary shaft 106. As a result, the signals output from the torque sensors 112, 113 change and are input to the control unit 111 again. Thus, the system of the gear-like workpiece grinding machine 101 is controlled by feedback through the control unit 111. In spite of the normally unavoidable secular variations such as the reduced sharpness of the cutting force due to the wear of the gear-shaped grinding stone 102 or the reduced rotational resistance due to the wear of the brake unit 104, therefore, the system always works in such a way that the rotational resistance approaches a predetermined value. Thus, the secular variations due to the wear of the grinding stone 102 and the brake unit 104 are corrected so that the tooth flanks 103b of the workpiece 103 can be ground while maintaining a high machining accuracy.

The gear-like workpiece 103 constituting an object to be machined, though shown as object like an internal gear in the second embodiment, may alternatively be an object like an external gear. In that case, the gear-shaped grinding stone 102 rotated by external power is an external or internal gear, as the case may be, and the brake unit 104 for braking the workpiece 103 in the shape of an external gear run free by the grinding stone 102 is configured to apply the braking force to the rotary support shaft of the workpiece 103 or the like.

Figure 8:
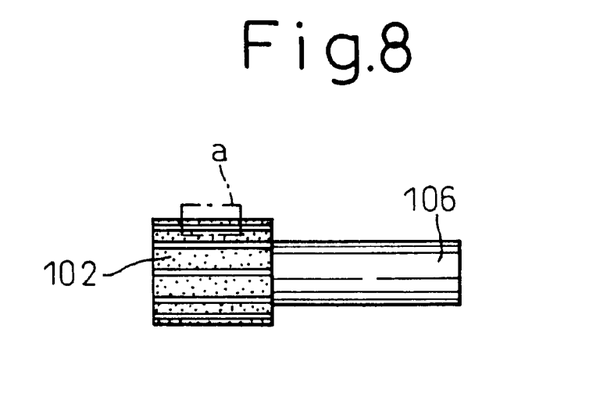
FIG. 8 is a front view showing a gear-shaped grinding stone.
Figure 9:
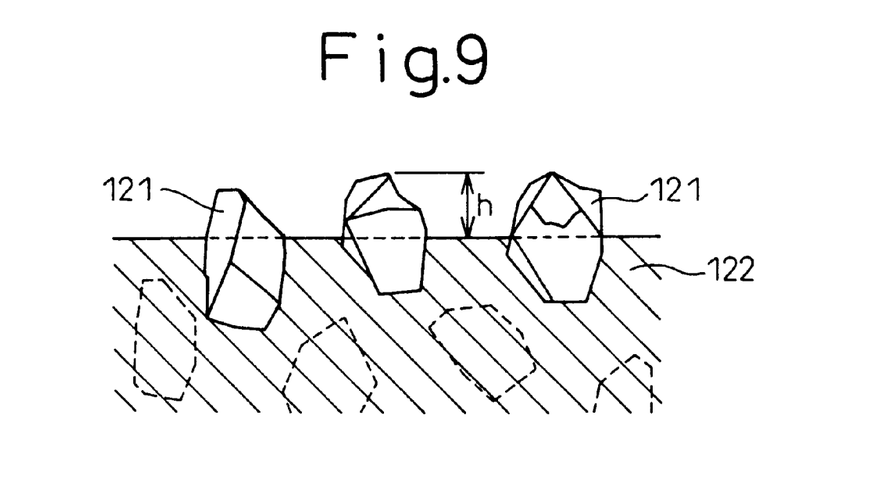
FIG. 9 is an enlarged view showing the surface of the gear-shaped grinding stone before use.

What is required, as an addition to the foregoing explanation, will be described in more detail below with reference to FIGS. 8 to 11. A part a of the surface of the gear-shaped grinding stone 102 in FIG. 8 is shown in a microscopically enlarged form in FIGS. 9 and 10. FIG. 9 shows the surface of a brand new gear-shaped grinding stone 102 before use, and FIG. 10 the surface of the grinding stone 102 worn after use. The grinding stone 102 is produced in such a manner that abrasive grains 121 constituted of fine pieces of a very hard material such as diamond are diffused into a metal paste composed of a binder material containing metal powder, and sintered after being formed into the shape of a gear around the rotary shaft 106. Thus, the surface of the grinding stone 102 is formed with the numerous sharp abrasive grains 121 partly protruded by the height of about h from the surface of the binder layer 122 solidified by sintering.

As long as the forward ends of the abrasive grains 121 are sharply protruded from the surface of the gear-shaped grinding stone 102, the grinding stone 102 exhibits a high sharpness. The forward ends of the abrasive grains 121, however, are worn gradually with time and become round like abrasive grains 121' shown in FIG. 10. Also, the height of the abrasive grains 121' is reduced to h', for example. Once the grinding stone 102 is worn in this way, the real contact area of the machining section where the tooth flanks 102a of the grinding stone 102 and the tooth flanks 103b of the workpiece 103 contact each other is increased, thereby increasing the grinding resistance, i.e. the resistance to the reciprocal motion of the grinding stone 102 along the direction of the rotary shaft 106. According to the second embodiment, the effective grinding force is obtained mainly by axial reciprocal motion of the grinding stone 102, and therefore the rotational motion of the grinding stone 102 works mainly to displace the machining section.

Figure 10:
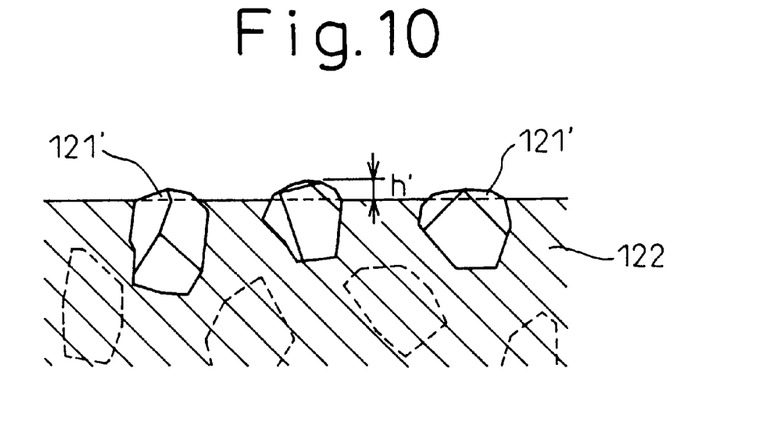
FIG. 10 is an enlarged view showing the surface of the gear-shaped grinding stone after use.

With the increase in the grinding resistance of the reciprocal motion by the wear of the gear-shaped grinding stone 102 as shown in FIG. 10, the force from the tooth flanks 102a for rotating the tooth flanks 103b in the direction R is increased especially at the machining section where the tooth flanks 102a of the grinding stone 102 contact the tooth flanks 103b of the workpiece 103, with the result that the workpiece 103 tends to be relieved by rotating in the direction R' for reducing the particular force. This reduces the contact pressure at the machining section, and the resulting lower grinding force reduces the grinding capacity.

In such a case, as far as the second embodiment is concerned, the rotational resistance T is reduced by the secular wear of the gear-shaped grinding stone 102 and the brake unit 104, thereby generally reducing the average torque generated by the rotation motor 107. Since the reduced sharpness of the grinding stone 102 increases the grinding resistance, on the other hand, the average torque of the reciprocating motor 108 increases so that the output signals of the torque sensors 112, 113 change and develop a difference with a reference torque signal. In accordance with this difference, the control unit 111 activates the brake actuator 110 and presses the brake unit 104 against the workpiece 103 with a greater strength. Thus, the rotational resistance T against the rotation of the workpiece 103 increases and prevents the rotating workpiece 103 from being relieved. Consequently, even when the gear-shaped grinding stone 102 or the brake 104 is worn to some degree, the required grinding capacity is secured. According to the second embodiment, therefore, the grinding machine 101 can be used steadily while maintaining a high accuracy for a long time without secular variations.

Figure 11:
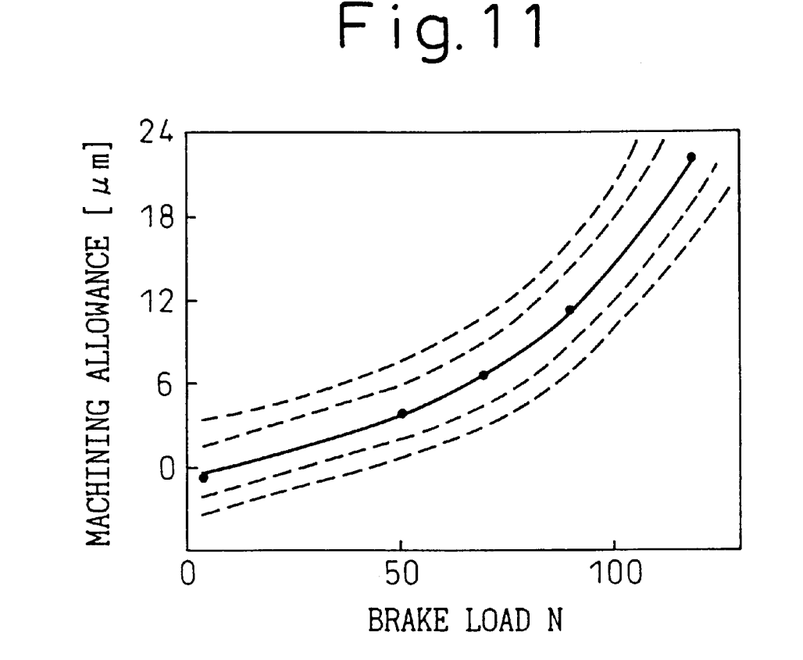
FIG. 11 is a diagram showing the relation between the brake load and the grinding capacity (machining allowance).

FIG. 11 shows the relation between the brake load N and the grinding capacity (machining allowance) at the machining section. With a change in brake load N, the grinding capacity changes along the solid curve as shown. Taking note of this fact, according to the second embodiment of the invention, the output voltages of the torque sensors 112, 113 such as current sensors for detecting the magnitude of the current flowing in the rotation motor 107 and the reciprocating motor 108 are amplified and averaged thereby to produce average torque signals each of which is arithmetically compared with a reference torque signal. In this way, a control signal is supplied to the brake actuator 110 thereby to control the brake load N.

The characteristic curve shown by solid line in FIG. 11 changes in parallel translation, as indicated by a dashed line, for example, according to the condition of the abrasive grains 121 illustrated in FIGS. 9 and 10. By determining the characteristic curve as shown in FIG. 11 experimentally in advance, therefore, the degree to which the curve of FIG. 11 has been parallelly translated can be estimated based on the change in the average torque signals output from the torque sensors 112, 113, e.g. the average current value of each of the rotation motor 107 and the reciprocating motor 108. The magnitude of the brake load N for the required grinding capacity can thus be determined from the average current value of the rotation motor 107 and the average current value of the reciprocating motor 108. The control unit 111 changes the brake load N by controlling the brake actuator 110 in this way.

The foregoing description about the grinding machine 101 refers only to the case in which the workpiece 103 is ground by the gear-shaped grinding stone 102. Nevertheless, the gear grinding machine and the gear grinding method according to this invention are also applicable directly to the correction and shaping of the gear-shaped grinding stone 102 simply by replacing the gear-like object to be machined (workpiece 103) with a gear-shaped grinding stone shaping member (dresser). This point will be explained in more detail with reference to the shown embodiments. As described above, the tooth flanks of the grinding stone 102 are gradually worn according as the workpiece 103 is ground, and undergo a change from the state shown in FIG. 9 to the state shown in FIG. 10 for a lower sharpness. In such a case, a dresser (gear-shaped grinding stone shaping member) having a shape similar to the workpiece 103 is mounted on the grinding machine 101 in place of the workpiece 103 and caused to engage the gear-shaped grinding stone 102, while at the same time activating the grinding machine 101 in the same manner as when grinding the workpiece 103. This dresser is formed of a material similar to that of the gear-shaped grinding stone 102. By doing so, the free running and the reciprocal motion relative to the free running is caused along the axial direction between the grinding stone 102 and the dresser. At the same time, the rotational torque of the grinding stone 102 is properly controlled by the control unit 111 and the brake unit 104, with the result that the surface of the grinding stone 102 is corrected and shaped thereby to restore the sharpness of the grinding stone 102 as shown in FIG. 9.

What is claimed is:

1. An internal tooth grinding machine for grinding the tooth flanks of the internal teeth of a workpiece having a circular outer periphery and a gear-shaped inner periphery in such a manner that the workpiece is caused to engage with a grinding stone having external teeth formed on the outer periphery thereof, and one of said grinding stone and said workpiece is rotated with the other run free, while at the same time reciprocating one of said grinding stone and said workpiece relative to the other in an axial direction, said internal tooth grinding machine comprising:
    at least two rollers located on the outer periphery of said workpiece for holding said workpiece at a machining position in collaboration with said grinding stone located on the inner periphery of said workpiece;
    a plurality of bearings for rotatably supporting said rollers, respectively;
    a block for supporting said bearings; and
    a roller support unit for pressing said workpiece against said grinding stone through said blocks and said rollers.

2. An internal tooth grinding machine according to claim 1, wherein said grinding stone is rotated while being reciprocated in the direction along the rotational axis by a grinding stone support unit.

3. An internal tooth grinding machine according to claim 1, wherein said rollers are rotated by a rotation drive unit while said workpiece and said grinding stone are driven and rotated.

4. An internal tooth grinding machine according to claim 3, wherein said grinding stone is reciprocated in the direction along the rotational axis thereof by said grinding stone support unit.

5. An internal tooth grinding machine according to claim 1, wherein the number of said rollers is at least three.

6. An internal tooth grinding machine according to claim 5, wherein a block for supporting at least one roller is movable in a radial direction to the blocks supporting the other rollers.

7. An internal tooth grinding machine according to claim 1, wherein an annular peripheral groove is formed on the outer peripheral surface of each of said rollers, and the outer peripheral surface of said workpiece engages said grooves.

8. A gear grinding machine for grinding the tooth flanks of internal teeth of a gear-like object to be machined having a circular outer periphery and a gear shaped inner periphery or shaping a gear-shaped grinding stone having external teeth formed on the outer periphery thereof in such a manner that said gear-like object or a gear-shaped grinding stone shaping member, as the case may be, is caused to engage the gear-shaped grinding stone, and one of said grinding stone and said gear-like object or said gear-shaped grinding stone shaping member as the case may be is rotated with the other run free, while at the same time reciprocating said gear-shaped grinding stone along the rotational axis thereof, said gear grinding machine comprising:
    means for detecting the magnitude of the grinding resistance exerted axially on said gear-shaped grinding stone n such a manner as to interfere with the reciprocal motion of said gear-shaped grinding stone;
    means for applying the rotational resistance to that one of said gear-shaped grinding stone and said gear-like object or said gear-shaped grinding stone shaping member which is run free in such a manner as to interfere with the rotation thereof; and
    means for controlling the rotational resistance to increase said rotational resistance by said rotational resistance application means when an increase of the grinding resistance is detected by said grinding resistance detection means.

9. A gear grinding machine according to claim 8, wherein said rotational resistance application means includes a brake unit.

10. A gear grinding machine according to claim 8, wherein said rotational resistance control means includes arithmetic means for calculating the average value of a signal detected by at least one of said grinding resistance detection means and said rotational resistance detection means, comparing said average value with a predetermined reference value and applying a control signal corresponding to the difference between said average value and said reference value to said rotational resistance application means.

11. A gear grinding machine according to claim 8, wherein said grinding resistance detection means includes a torque sensor for detecting the torque of a motor adapted to reciprocate said gear-shaped grinding stone in axial direction.

12. A gear grinding machine according to claim 11, wherein said torque sensor is a current sensor for detecting the value of the current flowing in a corresponding motor.

13. A gear grinding machine for grinding the tooth flanks of internal teeth of a gear-like object to be machined having a circular outer periphery and a gear-shaped inner periphery or shaping a gear-shaped grinding stone having external teeth formed on the outer periphery thereof in such a manner that said gear-like object or a gear-shaped grinding stone shaping member, as the case may be, is caused to engage the gear-shaped grinding stone, and one of said grinding stone and said gear-like object or said gear-shaped grinding stone shaping member, as the case may be, is rotated with the other run free, while at the same time reciprocating said gear-shaped grinding stone along the rotational axis thereof, said gear grinding machine comprising:

means for detecting the magnitude of the rotational resistance exerted in the direction opposite to the rotational direction of said gear-shaped grinding stone in such a manner as to interfere with the rotation of said gear-shaped grinding stone;

means for applying the rotational resistance to that one of said gear-shaped grinding stone and said gear-like object or said gear-shaped grinding stone shaping member which is run free in such a manner as to interfere with the rotation thereof; and     means for controlling the rotational resistance to increase said rotational resistance by said rotational resistance application means when a decrease of the rotational resistance is detected by said rotational resistance detection means.

14. A gear grinding machine according to claim 13, wherein said rotational resistance application means includes a brake unit.

15. A gear grinding machine according to claim 13, wherein said rotational resistance control means includes arithmetic means for calculating the average value of the signal detected by at least one of said grinding resistance detection means and said rotational resistance detection means, comparing said average value with a predetermined reference value and applying a control signal corresponding to the difference between said average value and said reference value to said rotational resistance application means.

16. A gear grinding machine according to claim 13, wherein said rotational resistance detection means includes a torque sensor for detecting the torque of a motor adapted to rotate said gear-shaped grinding stone.

17. A gear grinding machine according to claim 16, wherein said torque sensor is a current sensor for detecting the value of the current flowing in a corresponding motor.

18. A gear grinding machine for grinding tooth flanks of internal teeth of a gear-like object to be machined having a circular outer periphery and a gear-shaped inner periphery or shaping a gear-shaped grinding stone having external teeth formed on the outer periphery thereof in such a manner that said gear-like object or a gear-shaped grinding stone shaping member, as the case may be, is caused to engage the gear-shaped grinding stone, and one of said grinding stone and said gear-like object or said gear-shaped grinding stone shaping member, as the case may be, is rotated with the other run free, while at the same time reciprocating said gear-shaped grinding stone along the rotational axis thereof, said gear grinding machine comprising:

means for detecting the magnitude of the grinding resistance exerted axially on said gear-shaped grinding stone in such a manner as to interfere with the reciprocal motion of said gear-shaped grinding stone; means for detecting the magnitude of the rotational resistance exerted in the direction opposite to the rotational direction of said gear-shaped grinding stone in such a manner as to interfere with the rotational motion of said gear-shaped grinding stone; means for applying the rotational resistance to that one of said gear-shaped grinding stone and said gear-like object and (said gear-shaped grinding stone shaping member which is run free in such a manner as to interfere with the rotation thereof; and     means for controlling the rotational resistance to increase said rotational resistance by said rotational resistance application means when an increase of the grinding resistance is detected by said grinding resistance detection means and when a decrease of the rotational resistance is detected by said rotational resistance detection means.

19. A gear grinding machine according to claim 18, wherein said rotational resistance application means includes a brake unit.

20. A gear grinding machine according to claim 18, wherein said rotational resistance control means includes arithmetic means for calculating the average value of the signal detected by at least one of said grinding resistance detection means and said rotational resistance detection means, comparing said average value with a predetermined reference value and applying a control signal corresponding to the difference between said average value and said reference value to said rotational resistance application means.

21. A gear grinding machine according to claim 18, wherein said grinding resistance detection means includes a torque sensor for detecting the torque of a motor for reciprocating said gear-shaped grinding stone in axial direction, and said rotational resistance detection means includes a torque sensor for detecting the torque of a motor for rotating said gear-shaped grinding stone.

22. A gear grinding machine according to claim 21, wherein at least one of said torque sensors is a current sensor for detecting the value of the current flowing in the corresponding motor.

23. A method for grinding the tooth flanks of a gear-like object to be machined or shaping a gear-shaped grinding stone in such a manner that said gear-shaped grinding stone is caused to engage said gear-like object or said gear-shaped grinding stone shaping member, and one of said gear-shaped grinding stone and said gear-like object or a gear-shaped grinding stone shaping member, as the case may be, is rotated with the other run free, while at the same time reciprocating one of said gear shaped grinding stone and said gear-like object or said gear-shaped grindings stone shaping member relative to the other along the axial direction, said method comprising the steps of:

detecting the magnitude of the grinding resistance exerted in such a manner as to interfere with the reciprocal motion;

applying the rotational resistance to that one of said gear-shaped grinding stone and said gear-like object or said gear-shaped grinding stone shaping member which is run free in such a manner as to interfere with the rotation of said gear-shaped grinding stone and said gear-like object or said gear-shaped grinding stone shaping member, respectively; and     changing said rotational resistance toward a reference value by controlling said rotational resistance application means upon detection of a change of the grinding resistance.

24. A method for grinding the tooth flanks of a gear-like object to be machined or shaping a gear-shaped grinding stone in such a manner that said gear-shaped grinding stone is caused to engage said gear-like object or a gear-shaped grinding stone shaping member, and one of said gear-shaped grinding stone and said gear-like object or said gear-shaped grinding stone shaping member, as the case may be, is rotated with the other run free, while at the same time reciprocating one of said gear shaped grinding stone and said gear-like object or said gear-shaped grindings stone shaping member relative to the other along the axial direction, said method comprising the steps of:

detecting the magnitude of the rotational resistance exerted in the direction opposite to the rotational direction of said gear-shaped grinding stone and said gear-like object or said gear-shaped grinding stone shaping member in such a manner as to interfere with the rotational motion of said gear-shaped grinding stone and said gear-like object or said gear-shaped grinding stone shaping member, respectively;

applying the rotational resistance to that one of said gear-shaped grinding stone and said gear-like object or said gear-shaped grinding stone shaping member which is run free in such a manner as to interfere with the rotation of one of said gear-shaped grinding stone and said gear-like object or said gear-shaped grinding stone shaping member, respectively; and     changing the magnitude of said rotational resistance toward a reference value by controlling said rotational resistance application means upon detection of a change of the rotational resistance.

25. A method for grinding the tooth flanks of a gear-like object to be machined or shaping a gear-shaped grinding stone in such a manner that said gear-shaped grinding stone is caused to engage said gear-like object or said gear-shaped grinding stone shaping member, and one of said gear-shaped grinding stone and said gear-like object or a gear-shaped grinding stone shaping member, as the case may be, is rotated with the other run free, while at the same time reciprocating one of said gear shaped grinding stone and said gear-like object or said gear-shaped grinding stone shaping member relative to the other along the axial direction, said method comprising the steps of:

detecting the magnitude of the grinding resistance exerted in such a manner as to interfere with said reciprocal motion while at the same time detecting the magnitude of the rotational resistance exerted in the direction opposite to the rotational direction of said gear-shaped grinding stone and said gear-like object or said gear-shaped grinding stone shaping member in such a manner as to interfere with the rotational motion of said gear-shaped grinding stone and said gear-like object or said gear-shaped grinding stone shaping member, respectively;

applying the rotational resistance to that one of said gear-shaped grinding stone and said gear-like object and said gear-shaped grinding stone shaping member which is run free in such a manner as to interfere with the rotation of one of said gear-shaped grinding stone and said gear-like object and said gear-shaped grinding stone shaping member, respectively; and     changing the magnitude of said grinding resistance and the magnitude of said rotational resistance toward a corresponding reference value by controlling said rotational resistance application means upon detection of a change of at least one of said grinding resistance and said rotational resistance.

* * * * *